(12) United States Patent
Shiiba et al.

(10) Patent No.: US 7,469,178 B2
(45) Date of Patent: Dec. 23, 2008

(54) DECELERATION CONTROL APPARATUS AND METHOD FOR A VEHICLE

(75) Inventors: Kazuyuki Shiiba, Susono (JP); Kunihiro Iwatsuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 664 days.

(21) Appl. No.: 10/998,562

(22) Filed: Nov. 30, 2004

(65) Prior Publication Data

US 2005/0187694 A1    Aug. 25, 2005

(30) Foreign Application Priority Data

Feb. 10, 2004   (JP) ............... 2004-033390

(51) Int. Cl.
*G06F 7/70* (2006.01)
(52) U.S. Cl. ............... 701/70; 701/79; 701/90; 701/91; 701/96; 477/40
(58) Field of Classification Search ............ 701/65, 701/70, 79, 80, 87, 90, 96, 91; 303/152; 477/40; 340/903
See application file for complete search history.

(56) References Cited

U.S. PATENT DOCUMENTS

| | | | |
|---|---|---|---|
| 4,771,657 A | | 9/1988 | Iwatsuki |
| 5,085,104 A | * | 2/1992 | Kouno et al. ............... 477/40 |
| 5,113,718 A | | 5/1992 | Sato |
| 5,731,977 A | | 3/1998 | Taniguchi et al. |
| 5,748,476 A | | 5/1998 | Sekine et al. |
| 5,902,345 A | | 5/1999 | Minowa et al. |
| 6,126,251 A | | 10/2000 | Yoshii et al. |
| 6,161,073 A | | 12/2000 | Tange et al. |
| 6,182,000 B1 | | 1/2001 | Ohta et al. |
| 6,188,316 B1 | | 2/2001 | Matsuno et al. |
| 6,199,001 B1 | | 3/2001 | Ohta et al. |
| 6,208,927 B1 | | 3/2001 | Mine et al. |
| 6,216,082 B1 | | 4/2001 | Minowa et al. |

(Continued)

FOREIGN PATENT DOCUMENTS

DE    196 21 085 A1    11/1996

(Continued)

OTHER PUBLICATIONS

U.S. Appl. No. 11/491,039, filed Jul. 24, 2006, Shiiba et al.

(Continued)

*Primary Examiner*—Gertrude Arthur Jeangla
(74) *Attorney, Agent, or Firm*—Oblon, Spivak, McClelland, Maier & Neustadt, P.C.

(57) ABSTRACT

A deceleration control apparatus and method for a vehicle, which performs deceleration control on the vehicle by an operation of a brake system which applies a braking force to the vehicle and a shift operation which shifts a transmission of the vehicle into a relatively low speed or speed ratio, performs the shift operation and the operation of the brake system such that a target deceleration set based on a curvature or curvature radius of a curve in a road ahead of the vehicle, a distance to the curve, and a vehicle speed, acts on the vehicle. As a result, a desired deceleration according to the distance to the curve is able to be applied to the vehicle.

20 Claims, 9 Drawing Sheets

U.S. PATENT DOCUMENTS

| | | | |
|---|---|---|---|
| 6,223,118 | B1 | 4/2001 | Kobayashi et al. |
| 6,287,237 | B1 | 9/2001 | Graf et al. |
| 6,353,787 | B2 | 3/2002 | Nishiyama |
| 6,868,324 | B2 | 3/2005 | Matsumoto et al. |
| 2001/0008989 | A1 | 7/2001 | Minowa et al. |
| 2002/0026276 | A1 | 2/2002 | Hattori et al. |
| 2005/0187694 | A1 | 8/2005 | Shiiba et al. |

FOREIGN PATENT DOCUMENTS

| | | |
|---|---|---|
| DE | 198 07 095 A1 | 8/1999 |
| DE | 199 22 242 A1 | 12/1999 |
| DE | 100 39 920 A1 | 3/2001 |
| DE | 101 41 919 A1 | 3/2002 |
| DE | 102 16 546 A1 | 10/2002 |
| EP | 1 044 843 | 10/2000 |
| EP | 1 197 684 A1 | 4/2002 |
| JP | 64-30848 | 2/1989 |
| JP | 2-296062 | 12/1990 |
| JP | 5-240075 | 9/1993 |
| JP | 6-199156 | 7/1994 |
| JP | 7-1995 | 1/1995 |
| JP | 7-306998 | 11/1995 |
| JP | 8-85362 | 4/1996 |
| JP | 8-85373 | 4/1996 |
| JP | 2503426 | 4/1996 |
| JP | 8-147598 | 6/1996 |
| JP | 8-150914 | 6/1996 |
| JP | 8-301084 A | 11/1996 |
| JP | 9-142175 | 6/1997 |
| JP | 9-242863 | 9/1997 |
| JP | 9-280353 | 10/1997 |
| JP | 10-132072 | 5/1998 |
| JP | 10-184877 | 7/1998 |
| JP | 10-185603 | 7/1998 |
| JP | 10-203203 | 8/1998 |
| JP | 10-236290 | 9/1998 |
| JP | 10-264788 | 10/1998 |
| JP | 10-264791 | 10/1998 |
| JP | 10-324175 | 12/1998 |
| JP | 11-63211 | 3/1999 |
| JP | 11-101141 | 4/1999 |
| JP | 11-115545 | 4/1999 |
| JP | 11-222055 | 8/1999 |
| JP | 11-278096 | 10/1999 |
| JP | 2000-39062 | 2/2000 |
| JP | 2000-43696 | 2/2000 |
| JP | 2000-127803 | 5/2000 |
| JP | 2000-127804 | 5/2000 |
| JP | 2000-145937 | 5/2000 |
| JP | 2000-168521 | 6/2000 |
| JP | 2000-233730 | 8/2000 |
| JP | 2000-245016 | 9/2000 |
| JP | 2000-318484 | 11/2000 |
| JP | 2001-26228 | 1/2001 |
| JP | 2001-27317 | 1/2001 |
| JP | 2001-30792 | 2/2001 |
| JP | 2001-90831 | 4/2001 |
| JP | 2001-341546 | 12/2001 |
| JP | 2002-217028 | 8/2002 |
| JP | 2003-99897 | 4/2003 |
| JP | 2003-118425 | 4/2003 |
| JP | 2003-237420 | 8/2003 |
| JP | 2003-256999 | 9/2003 |
| KR | 1997-0044795 | 7/1997 |
| KR | 1998-046906 | 9/1998 |

OTHER PUBLICATIONS

U.S. Appl. No. 11/338,693, filed Jan. 25, 2006, Shiiba et al.
U.S. Appl. No. 10/998,562, filed Nov. 30, 2004, Shiiba et al.
U.S. Appl. No. 11/081,584, filed Mar. 17, 2005, Iwatsuki et al.
U.S. Appl. No. 11/085,177, filed Mar. 22, 2005, Shiiba et al.
U.S. Appl. No. 11/094,216, filed Mar. 31, 2005, Iwatsuki et al.
U.S. Appl. No. 10/998,958, filed Nov. 30, 2004, Iwatsuki et al.
U.S. Appl. No. 10/998,562, filed Nov. 30, 2004, Shiiba et al.
U.S. Appl. No. 10/999,136, filed Nov. 30, 2004, Iwatsuki et al.
U.S. Appl. No. 10/998,558, filed Nov. 30, 2004, Shiiba et al.

* cited by examiner

|      | C0 | C1 | C2 | B0 | B1 | B2 | B3 | B4 | F0 | F1 | F2 |
|------|----|----|----|----|----|----|----|----|----|----|----|
| P    | ○  |    |    |    |    |    |    |    | ○  |    |    |
| R    |    |    | ○  | ○  |    |    |    | ○  |    |    |    |
| N    | ○  |    |    |    |    |    |    |    | ○  |    |    |
| 1st  | ○  | ○  |    |    |    |    |    | ◎  | ○  |    | ○  |
| 2nd  | ◎  | ○  |    |    |    |    | ○  |    | ○  |    |    |
| 3rd  | ○  | ○  |    |    | ◎  | ○  |    |    | ○  | ○  |    |
| 4th  | ○  | ○  | ○  |    |    | △  |    |    | ○  |    |    |
| 5th  |    | ○  | ○  | ○  |    | △  |    |    |    |    |    |

○ APPLIED
◎ APPLIED WHEN ENGINE BRAKE IS ENGAGED
△ APPLIED BUT NOT TRANSMITTING POWER

UNIT: G  No = AT OUTPUT SPEED rpm

| SPEED \ No | 1000 | 2000 | 3000 | 4000 |
|---|---|---|---|---|
| ⇒5 | −0.04 | −0.05 | −0.06 | −0.07 |
| ⇒4 | −0.05 | −0.06 | −0.07 | −0.09 |
| ⇒3 | −0.06 | −0.07 | −0.09 | −0.12 |
| ⇒2 | −0.08 | −0.10 | −0.12 | 0.0 |

FIG. 11

UNIT: G  No = AT OUTPUT SPEED rpm

| NECESSARY DECELERATION \ No | 1000 | 2000 | 3000 | 4000 |
|---|---|---|---|---|
| −0.2 | 0.0 | 0.0 | 0.0 | 0.0 |
| −0.5 | 0.0 | −0.005 | −0.007 | −0.01 |
| −1.0 | −0.005 | −0.007 | −0.01 | −0.012 |

DECELERATION CONTROL APPARATUS AND METHOD FOR A VEHICLE

INCORPORATION BY REFERENCE

The disclosure of Japanese Patent Application No. 2004-033390 filed on Feb. 10, 2004 including the specification, drawings and abstract is incorporated herein by reference in its entirety.

BACKGROUND OF THE INVENTION

1. Field of the Invention

The invention relates to a deceleration control apparatus and method for a vehicle. More particularly, the invention relates to a deceleration control apparatus and method for a vehicle, which controls deceleration of the vehicle by an operation of a brake system which applies braking force to the vehicle and a shift operation that shifts an automatic transmission into a relatively low speed.

2. Description of the Related Art

JP(A) 10-132072 discloses technology which detects the current position of a vehicle and an upcoming curve, searches for a recommended speed that will enable the vehicle to travel smoothly through the upcoming curve, and decelerates the vehicle to the recommended speed when entering or going into the curve using the engine brake by downshifting into a lower speed when it has been detected that the accelerator pedal has been released.

When shift point control is performed in a stepped automatic transmission in order to apply a predetermined deceleration to the vehicle according to the size of the corner, it may not be possible to apply the optimum deceleration to the vehicle. For example, often times the speed selected by the shift point control (i.e., the downshift amount) is set to always be the same for the same corner size, vehicle speed, and current speed, regardless of the distance from the location at which it was detected that the accelerator pedal was released to the corner. As a result, it is often not possible to have the optimum deceleration be applied to the vehicle.

In JP(A) 10-132072, a downshift is triggered by the release of the accelerator pedal. However, unless there is a brake operation for further deceleration by the driver, the target deceleration is left unchanged and the vehicle will travel through the curve at a speed higher than the recommended speed. In this way, a vehicle may enter a curve in a deceleration state that does not match the suitable recommended speed, which may result in riding discomfort.

SUMMARY OF THE INVENTION

In view of the foregoing problems, this invention thus provides a deceleration control apparatus and method for a vehicle, which is capable of applying a deceleration to the vehicle that is desirable for the distance to a corner.

Thus, a first aspect of the invention relates to a deceleration control apparatus for a vehicle, which performs deceleration control on the vehicle by an operation of a brake system which applies a braking force to the vehicle and a shift operation which shifts a transmission of the vehicle into a relatively low speed or speed ratio. This deceleration control apparatus includes a controller which performs the shift operation and the operation of the brake system such that a target deceleration set based on i) a curvature or curvature radius of a curve in a road ahead of the vehicle, ii) a distance to the curve, and iii) a vehicle speed, acts on the vehicle.

Another aspect of this invention relates to a deceleration control method for a vehicle, by which deceleration control is performed on the vehicle by an operation of a brake system which applies a braking force to the vehicle and a shift operation which shifts a transmission of the vehicle into a relatively low speed or speed ratio. This control method includes the steps of i) setting a target deceleration of the vehicle based on a curvature or curvature radius of a curve in a road ahead of the vehicle, a distance to the curve, and a vehicle speed, and ii) performing the shift operation and the operation of the brake system so that the target deceleration acts on the vehicle.

According to the foregoing deceleration control apparatus and method for a vehicle, even if the timing (distance to the curve) at which the driver performs the deceleration operation is different, a predetermined deceleration is still able to be reliably achieved by the time the vehicle reaches the entrance of the curve. Also, the brake system is able to control the deceleration output with better response than can the automatic transmission, which makes it suitable for feedback controlling the actual deceleration with respect to a deceleration target value. Because the target deceleration necessary when going into a curve is able to be achieved by the shift operation and the operation of the brake system, and the driving force is set by the speed after the shift operation after the deceleration control has ended, driving force is able to be achieved that is suitable for both going into and coming out of a curve. With the deceleration control according to the control apparatus and method, it is possible to simultaneously execute operation of the brake system (i.e., brake control) and the shift operation (i.e., shift control) in cooperation with one another.

Still another aspect of the invention relates to a deceleration control apparatus for a vehicle, which performs deceleration control on the vehicle by an operation of a brake system which applies a braking force to the vehicle and a shift operation which shifts a transmission of the vehicle into a relatively low speed or speed ratio. This apparatus includes a controller which i) sets a deceleration to be applied to the vehicle as a base deceleration based on a curvature or curvature radius of a curve in a road ahead of the vehicle, and ii) determines a correction amount of the deceleration to be applied to the vehicle in addition to the base deceleration, based on the distance to the curve.

Still yet another aspect of the invention relates to a deceleration control method for a vehicle, by which deceleration control is performed on the vehicle by an operation of a brake system which applies a braking force to the vehicle and a shift operation which shifts a transmission of the vehicle into a relatively low speed or speed ratio. This control method includes the steps of i) setting a deceleration to be applied to the vehicle as a base deceleration based on a curvature or curvature radius of a curve in a road ahead of the vehicle, ii) determining a correction amount of the deceleration to be applied to the vehicle in addition to the base deceleration, based on a distance to the curve, and iii) performing the shift operation and the operation of the brake system such that a deceleration which is the sum of the base deceleration and the correction amount acts on the vehicle.

The invention enables the same effects as those described above to be obtained. When the distance to the curve is great, the correction amount is small, and when that distance is small, the correction amount is large. (Note: when the deceleration or the correction amount referred to here and throughout this specification is said to be large or small, it is referring to the size of the absolute value of the deceleration or the correction amount.)

Also, with the deceleration control apparatus and method for a vehicle described above, it is particularly easy to set a speed change amount that takes into consideration the balance between the deceleration force (when going into a curve) and the acceleration force (when coming out of a curve). When going into a curve, a braking force which is a combination of the braking force by the brake system and a speed suitable for after the vehicle has entered the curve can be generated, such that suitable vehicle driving characteristics going into the curve, as well as after the vehicle has entered the curve, can be obtained. The speed change amount in the shift operation can be set based on the curvature or the curvature radius of the curve and the road gradient. When setting the speed change amount in the shift operation, the distance to the curve does not have to be taken into account. As a result, the speed change amount can be set based on the curvature or the curvature radius of the curve, without being effected by the distance to the curve, which makes it particularly easy to set a speed change amount that takes into consideration the balance between the deceleration force (when going into the curve) and the acceleration force (when coming out of the curve).

BRIEF DESCRIPTION OF THE DRAWINGS

The above-mentioned and other objects, features, advantages, technical and industrial significance of this invention will be better understood by reading the following detailed description of exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

One exemplary embodiment will now be described with reference to FIGS. 1 to 11. This exemplary embodiment relates to a deceleration control apparatus for a vehicle that performs cooperative control of a brake (i.e., a brake system) and an automatic transmission.

In this exemplary embodiment, when shift point control (which selects the optimum speed based on, for example, the curvature radius of an upcoming corner) is performed by cooperative control of a stepped automatic transmission and the brakes, the optimum deceleration characteristics are able to be achieved by adding the deceleration determined based on a parameter that is determined by the vehicle speed, the curvature radius of the corner, and the required timing of the deceleration, to the deceleration by a downshift of the automatic transmission (AT).

In terms of the structure of this exemplary embodiment, it is assumed that i) a stepped transmission capable of changing speeds or speed ratios, ii) means for detecting a corner and executing a downshift control in response to an intention to downshift by the driver, and iii) means for braking by a brake in cooperation with the downshift control, are provided. These will be described in detail below.

Figure 2:
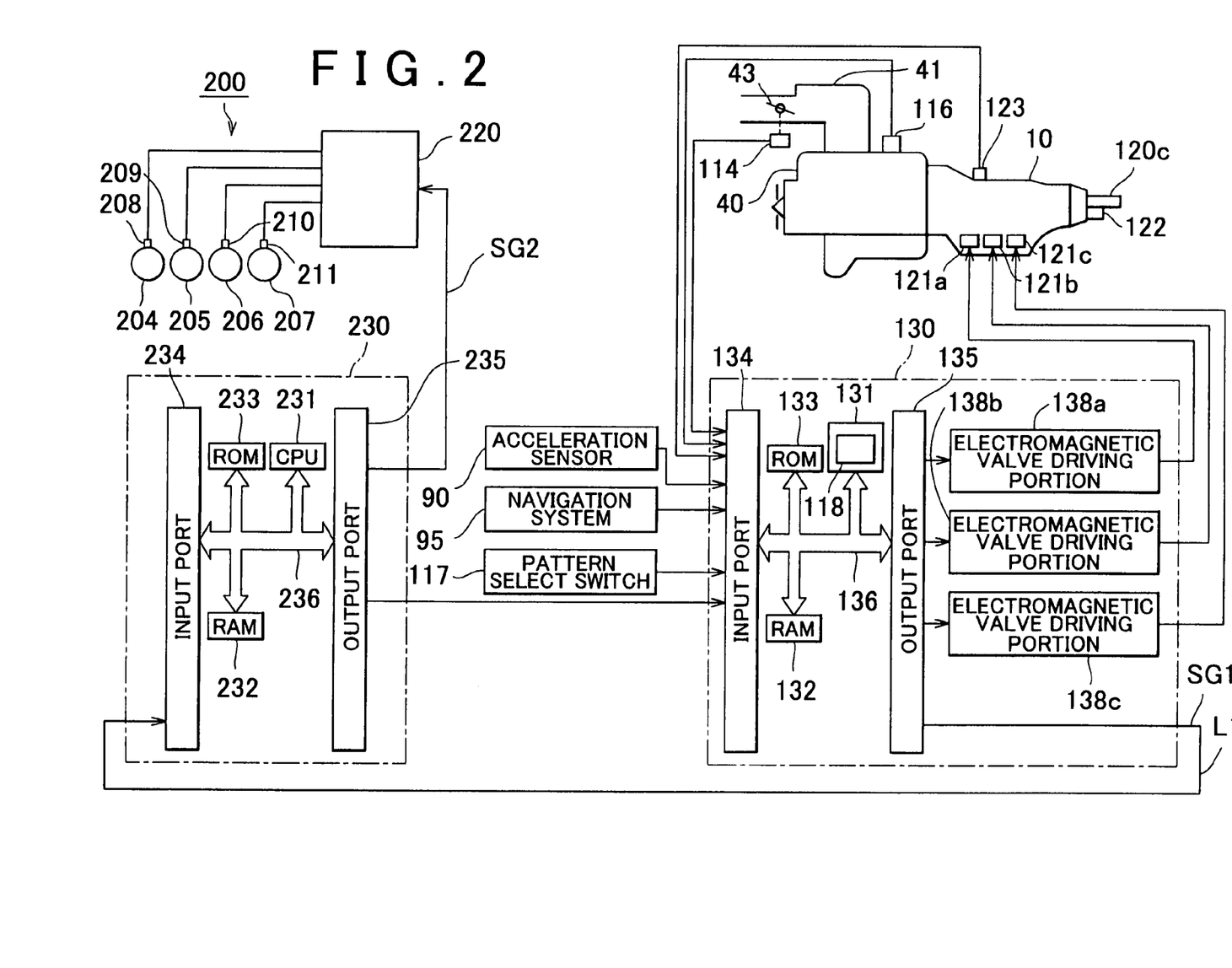
FIG. 2 is a block diagram schematically showing the deceleration control apparatus for a vehicle according to the first exemplary embodiment of the invention.

FIG. 2 shows a stepped automatic transmission 10, an engine 40, and a brake system 200. The automatic transmission 10 is capable of achieving five speeds (1st speed to 5th speed) by controlling hydraulic pressure, which is done by energizing or de-energizing electromagnetic valves 121a, 121b, and 121c. FIG. 2 shows three electromagnetic valves 121a, 121b, and 121c, but their number is not limited to this. These electromagnetic valves 121a, 121b, and 121c are driven by signals sent from a control circuit 130.

A throttle opening amount sensor 114 detects an opening amount of a throttle valve 43 disposed inside an intake passage 41 of the engine 40. An engine speed sensor 116 detects the speed of the engine 40. A vehicle speed sensor 122 detects the rotational speed an output shaft 120c of the automatic transmission 10 in proportion to the vehicle speed. A shift position sensor 123 detects a shift position of the automatic transmission 10. A pattern select switch 117 is used when selecting a shift pattern of the automatic transmission 10. An acceleration sensor 90 detects a deceleration of the vehicle.

A navigation system 95 basically serves to guide the host vehicle to a predetermined destination, and includes a computing and processing unit, an information storage medium, a first information detecting apparatus, and a second information detecting apparatus. The information storage medium stores information necessary for vehicle travel (such as maps, straight sections of road, curves, inclines (both uphill and downhill), and expressways). The first information detecting apparatus detects the current position of the host vehicle and the road conditions by autonomous navigation, and includes a magnetic sensor, a gyrocompass, and a steering sensor. The second information detecting apparatus also detects the current position of the host vehicle and the road conditions and the like by autonomous navigation, and includes a GPS antenna and a GPS transceiver and the like.

The signals indicative of the various detection results from the throttle opening amount sensor 114, the engine speed sensor 116, the vehicle speed sensor 122, the shift position sensor 123, and the acceleration sensor 90 are all input to the control circuit 130. Also input to the control circuit 130 are a signal indicative of the switching state of the pattern select switch 117 and a signal from the navigation system 95.

The control circuit 130 is a known micro-computer, and includes a CPU 131, RAM 132, ROM 133, an input port 134, an output port 135, and a common bus 136. Signals from the various sensors 114, 116, 122, 123, and 90, as well as signals from the pattern select switch 117, and the navigation system 95 are all input to the input port 134. Electromagnetic valve driving portions 138a, 138b, and 138c, as well as a brake braking force signal line L1 leading to a brake control circuit 230 are all connected to the output port 135. The brake braking force signal line L1 transmits a brake braking force signal SG1.

The control circuit 130 is provided with a road gradient measuring/estimating portion 118. The road gradient measuring/estimating portion 118 can be provided as part of the CPU 131, and can measure or estimate the road gradient based on acceleration detected by the acceleration sensor 90. Further, the road gradient measuring/estimating portion 118 can store acceleration on a level road in the ROM 133 in advance, and obtain the road gradient by comparing that stored acceleration with the actual acceleration detected by the acceleration sensor 90.

Figure 1A:
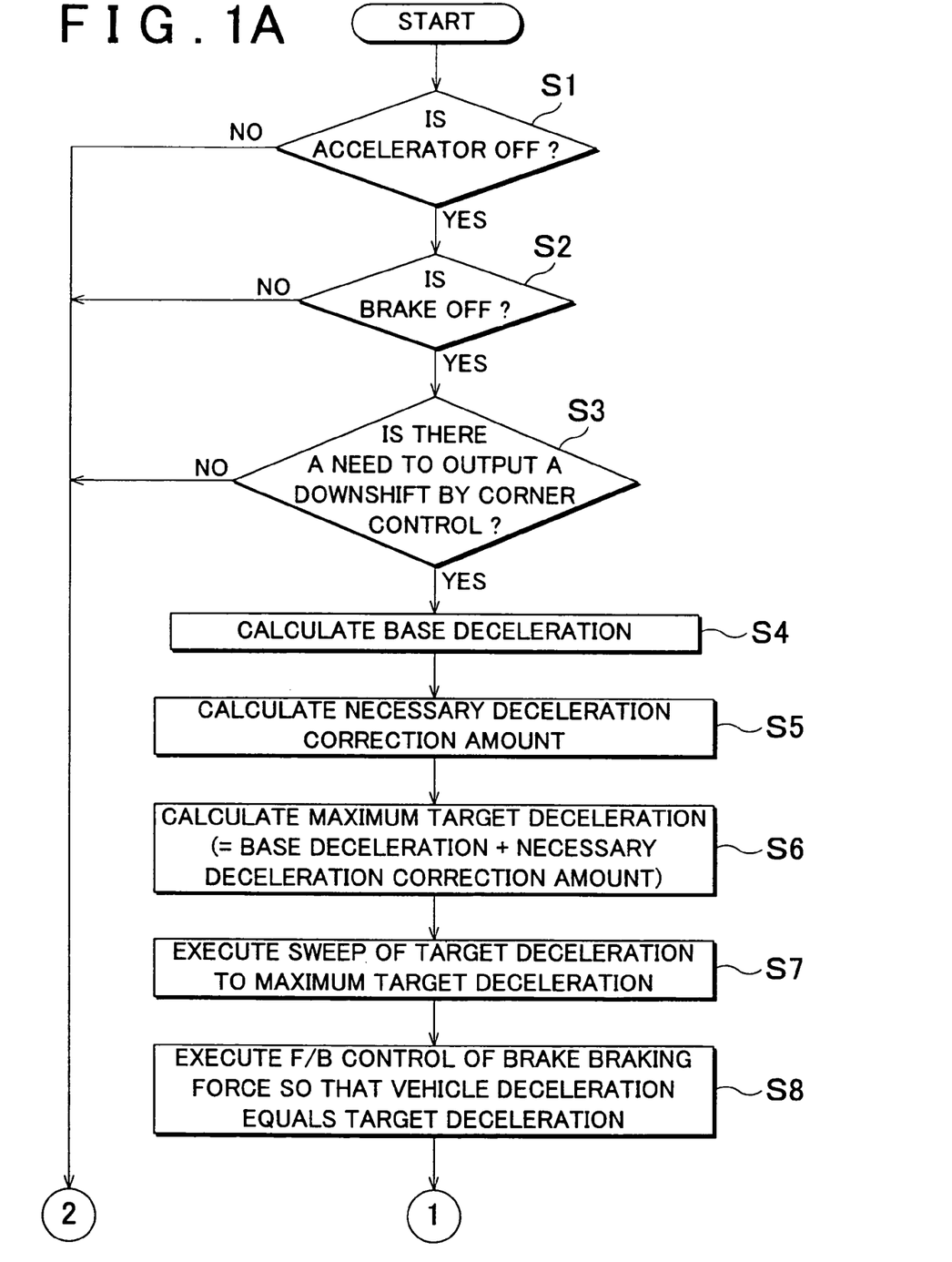
FIG. 1A and FIG. 1B are flowcharts illustrating an operation by a deceleration control apparatus for a vehicle according to a first exemplary embodiment of the invention.
Figure 1B:
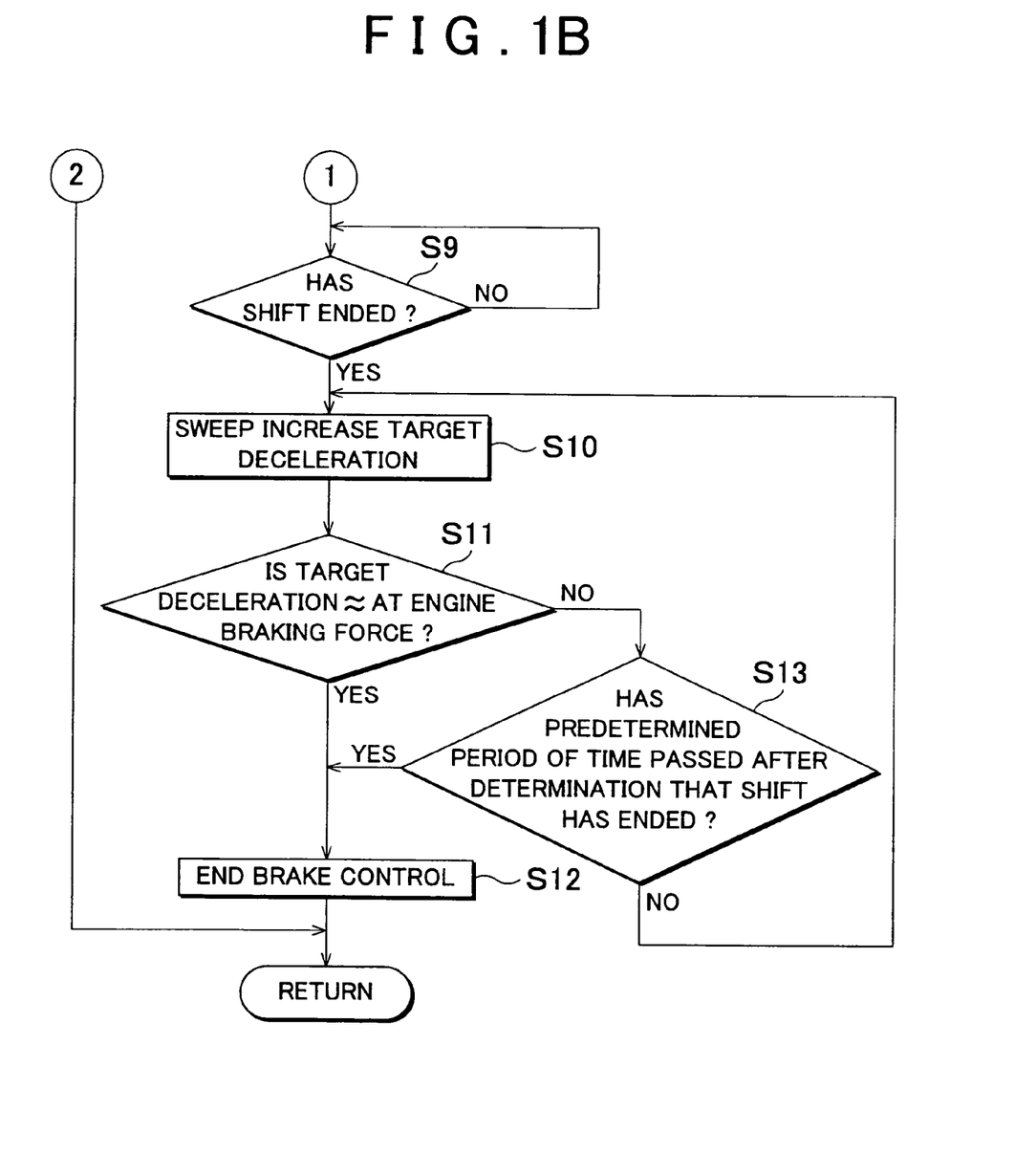

An operation (control steps) illustrated in the flowchart in FIG. 1A and FIG. 1B, in addition to the maps shown in FIGS. 5 and 8 to 11, and an operation for shift control (not shown), are stored in the ROM 133 in advance. The control circuit 130 shifts the automatic transmission 10 based on the various control conditions that are input.

The brake system 200 is controlled by the brake control circuit 230, into which the brake braking force signal SG1 is input from the control circuit 130, so as to brake the vehicle. The brake system 200 includes a hydraulic pressure control circuit 220 and brake devices 208, 209, 210, and 211 provided on vehicle wheels 204, 205, 206, and 207, respectively. Each brake device 208, 209, 210, and 211 controls the braking force of the corresponding wheel 204, 205, 206, and 207 according to a brake hydraulic pressure which is controlled by the hydraulic pressure control circuit 220. The hydraulic pressure control circuit 220 is controlled by the brake control circuit 230.

The hydraulic pressure control circuit 220 performs brake control by controlling the brake hydraulic pressure supplied to each brake device 208, 209, 210, and 211 based on a brake control signal SG2 that ultimately determines the braking force to be applied to the vehicle. The brake control signal SG2 is generated by the brake control circuit 230 based on the brake braking force signal SG1 that the brake control circuit 230 receives from the control circuit 130 of the automatic transmission 10.

The brake control circuit 230 is a known micro-computer, and includes a CPU 231, RAM 232, ROM 233, an input port 234, an output port 235, and a common bus 236. The hydraulic pressure control circuit 220 is connected to the output port 235. The operation for generating the brake control signal SG2 based on the various data included in the brake braking force signal SG1 is stored in the ROM 233. The brake control circuit 230 controls the brake system 200 (i.e., performs brake control) based on the various control conditions that are input.

Figure 3:
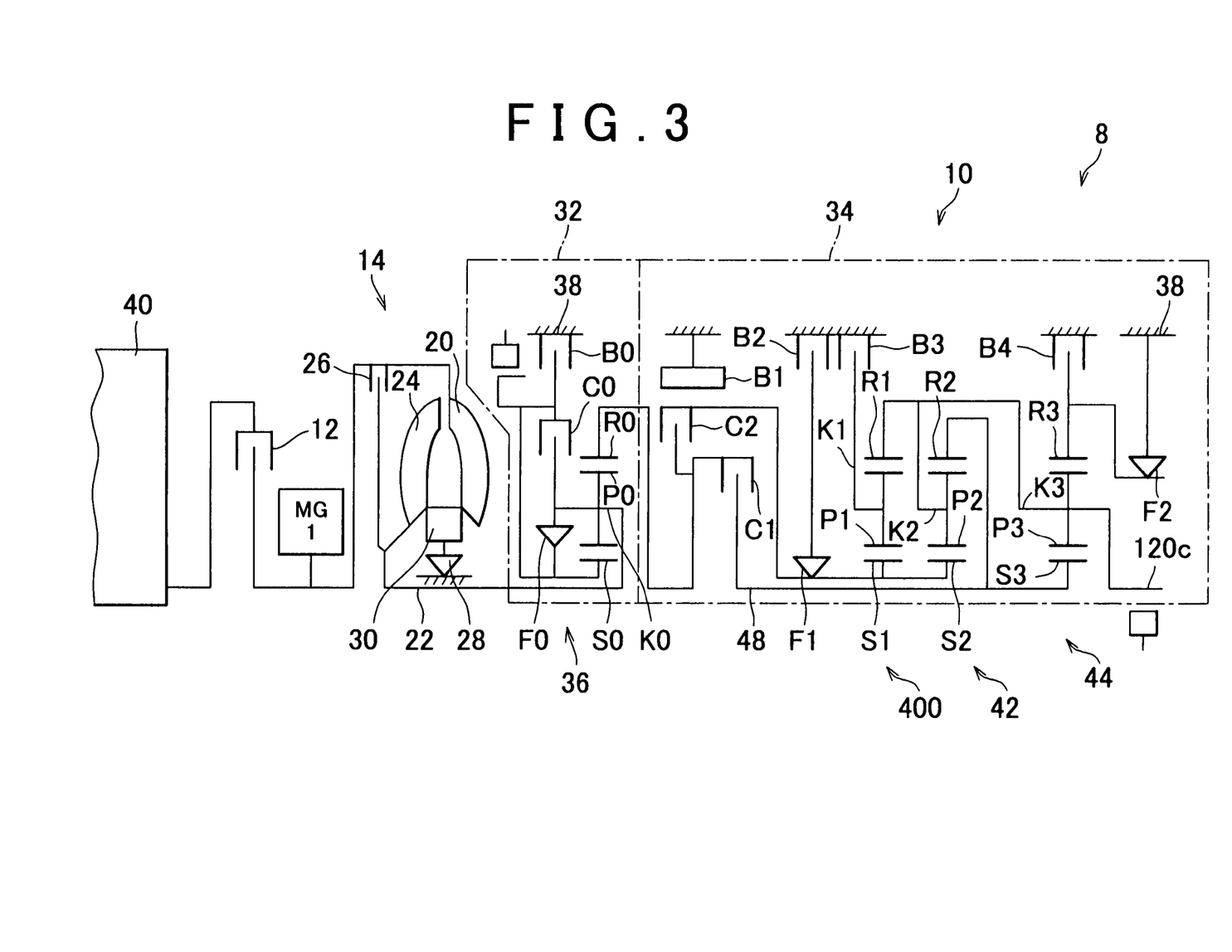
FIG. 3 is a skeleton view of an automatic transmission of the deceleration control apparatus for a vehicle according to the first exemplary embodiment of the invention.

Next, the structure of the automatic transmission 10 is shown in FIG. 3. In the drawing, output from the engine 40, i.e., an internal combustion engine which serves as the driving source for running the vehicle, is input to the automatic transmission 10 via an input clutch 12 and a torque converter 14, which is a hydraulic power transmitting device, and transmitted to driven wheels via a differential gear unit and an axle, not shown. A first motor/generator MG1 which functions as both an electric motor and a generator is arranged between the input clutch 12 and the torque converter 14.

The torque converter 14 includes a pump impeller 20 which is coupled to the input clutch 12, a turbine runner 24 which is coupled to an input shaft 22 of the automatic transmission 10, a lock-up clutch 26 for locking the pump impeller 20 and the turbine runner 24 together, and a stator 30 that is prevented from rotating in one direction by a one-way clutch 28.

The automatic transmission 10 includes a first transmitting portion 32 which switches between a high speed and a low speed, and a second transmitting portion 34 which is capable of switching between a reverse speed and four forward speeds. The first transmitting portion 32 includes an HL planetary gearset 36, a clutch C0, a one-way clutch F0, and a brake B0. The HL planetary gearset 36 includes a sun gear S0, a ring gear R0, and planetary gears P0 that are rotatably supported by a carrier K0 and in mesh with the sun gear S0 and the ring gear R0. The clutch C0 and the one-way clutch F0 are provided between the sun gear S0 and the carrier K0, and the brake B0 is provided between the sun gear S0 and a housing 38.

The second transmitting portion 34 includes a first planetary gearset 400, a second planetary gearset 42, and a third planetary gearset 44. The first planetary gearset 400 includes a sun gear S1, a ring gear R1, and planetary gears P1 that are rotatably supported by a carrier K1 and in mesh with the sun gear S1 and the ring gear R1. The second planetary gearset 42 includes a sun gear S2, a ring gear R2, and planetary gears P2 that are rotatably supported by a carrier K2 and in mesh with the sun gear S2 and the ring gear R2. The third planetary gearset 44 includes a sun gear S3, a ring gear R3, and planetary gears P3 that are rotatably supported by a carrier K3 and in mesh with the sun gear S3 and the ring gear R3.

The sun gear S1 and the sun gear S2 are integrally coupled together, while the ring gear R1 and the carrier K2 and the carrier K3 are integrally coupled together. The carrier K3 is coupled to the output shaft 120c. Similarly, the ring gear R2 is integrally coupled to the sun gear S3 and an intermediate shaft 48. A clutch C1 is provided between the ring gear R0 and the intermediate shaft 48, and a clutch C2 is provided between the sun gear S1 and the sun gear S2, and the ring gear R0. Also, a band brake B1 is provided on the housing 38 in order to prevent the sun gear S1 and the sun gear S2 from rotating. Further, a one-way clutch F1 and a brake B2 are provided in series between the sun gear S1 and the sun gear S2, and the housing 38. The one-way clutch F1 applies when the sun gear S1 and the sun gear S2 try to rotate in the direction opposite that of the input shaft 22.

A brake B3 is provided between the carrier K1 and the housing 38, and a brake B4 and a one-way clutch F2 are provided in parallel between the ring gear R3 and the housing 38. The one-way clutch F2 applies when the ring gear R3 tries to rotate in the direction opposite that of the input shaft 22.

Figure 4:
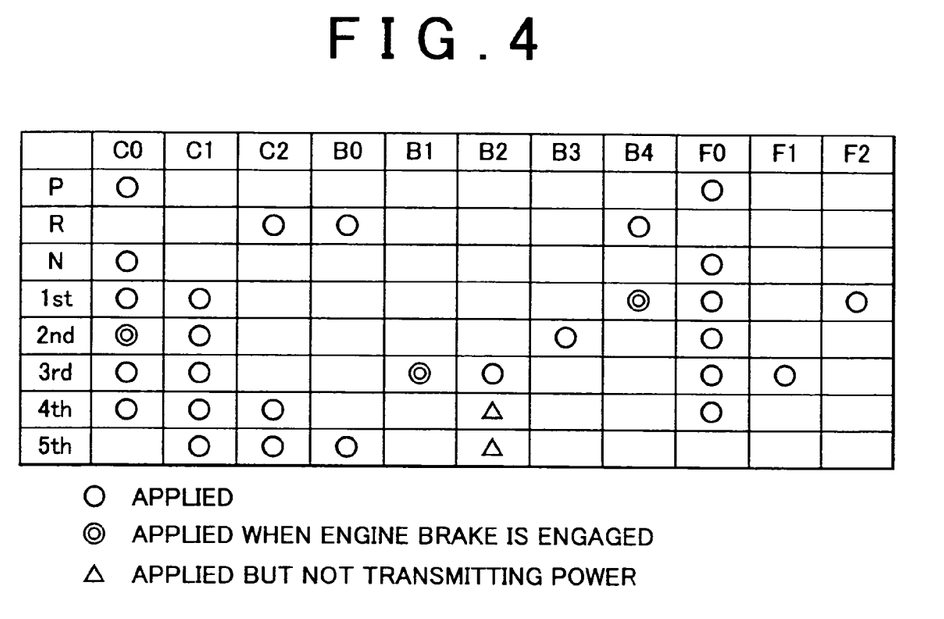
FIG. 4 is a table showing engagement/disengagement combinations of the automatic transmission shown in FIG. 3.

The automatic transmission 10 of the above-described structure is able to switch between any of one reverse speed and five forward speeds (1st to 5th) of different speed ratios, according to the table showing engagement/disengagement combinations of the automatic transmission shown in FIG. 4, for example. In the table in FIG. 4, the single circle indicates application, a blank space indicates release, a double circle (bulls-eye) indicates application when the engine brake is engaged, and a triangle indicates application but with no power being transmitted. The clutches C0 to C2 and the brakes B0 to B4 are all hydraulic friction apply devices that are applied by hydraulic actuators.

Figure 5:
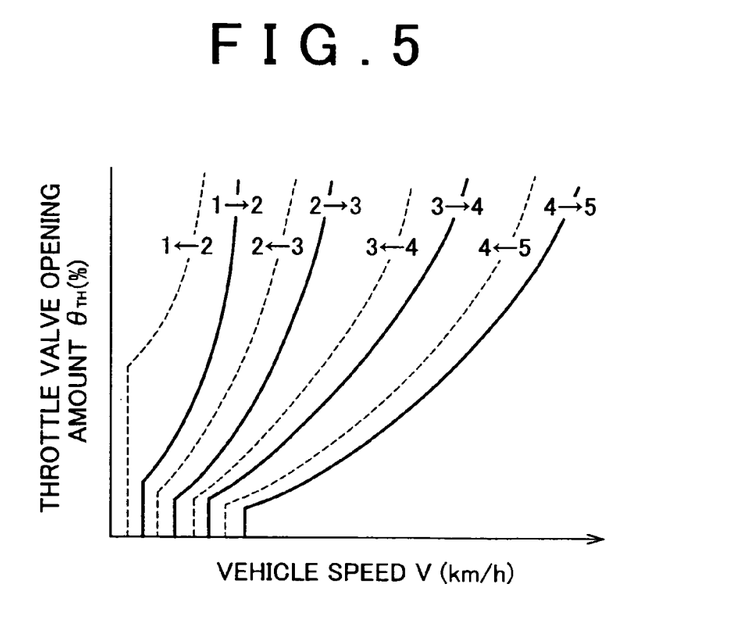
FIG. 5 is a shift line graph of the automatic transmission shown in FIG. 3.

The control circuit 130 determines the gear speed of the automatic transmission 10 based on the vehicle speed V and the accelerator opening amount corresponding to the actual engine load from a shift line map, such as that shown in FIG. 5, stored beforehand. The control circuit 130 then executes automatic shift control that controls the electromagnetic valves 121a to 121c in the hydraulic pressure control circuit provided in the automatic transmission 10 so as to establish the determined gear speed. The solid line in FIG. 5 is the upshift line and the broken line is the downshift line.

The operation of the exemplary embodiment will now be described with respect to FIGS. 1, 2, 6, and 7.

Figure 6:
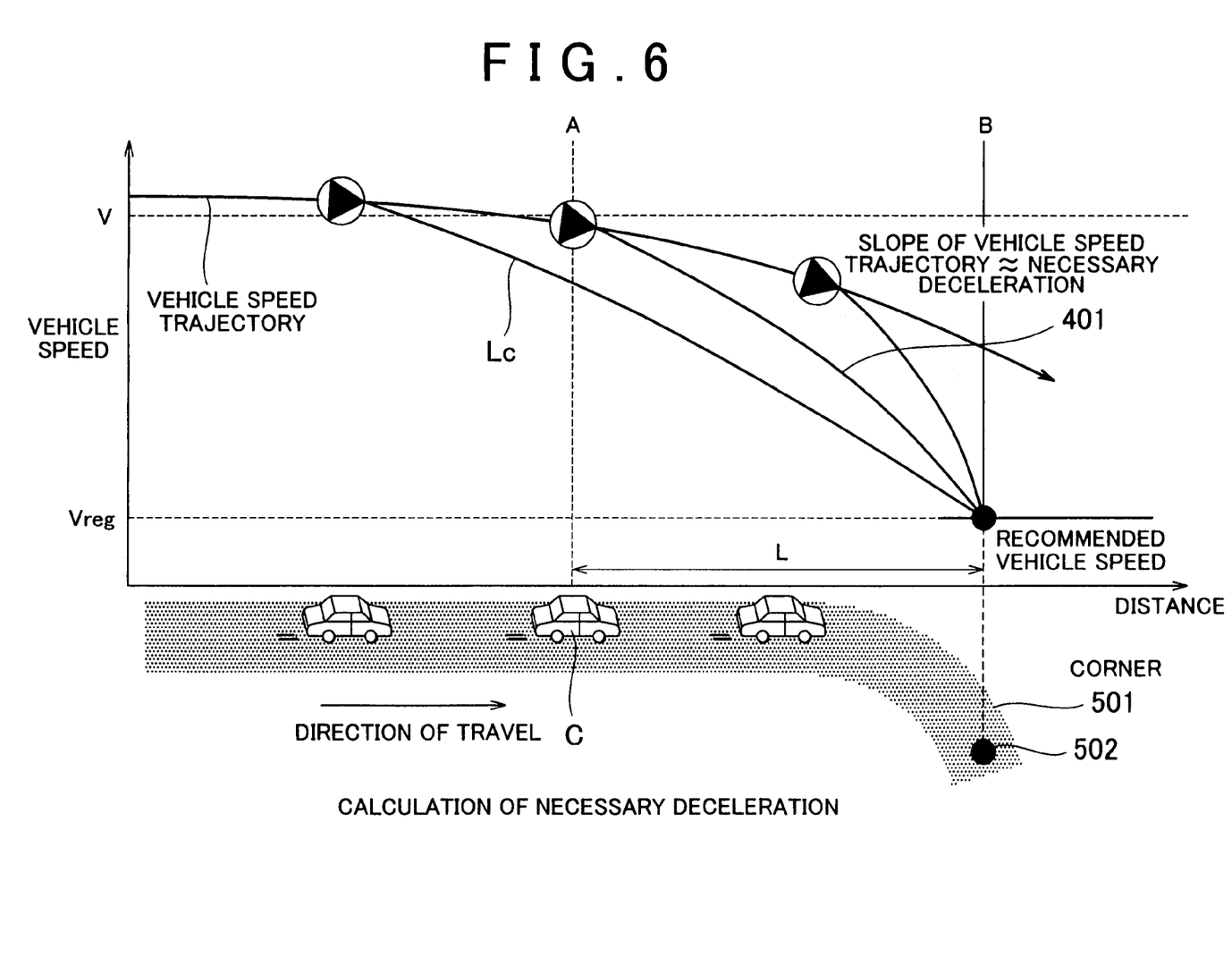
FIG. 6 is a view illustrating the necessary deceleration of the deceleration control apparatus for a vehicle according to the first exemplary embodiment of the invention.

FIG. 6 is a view illustrating the necessary deceleration in the deceleration control of the exemplary embodiment. The drawing is a view from above of the road shape, which includes the control execution boundary line Lc, the necessary deceleration 401, and a corner 501.

Figure 7:
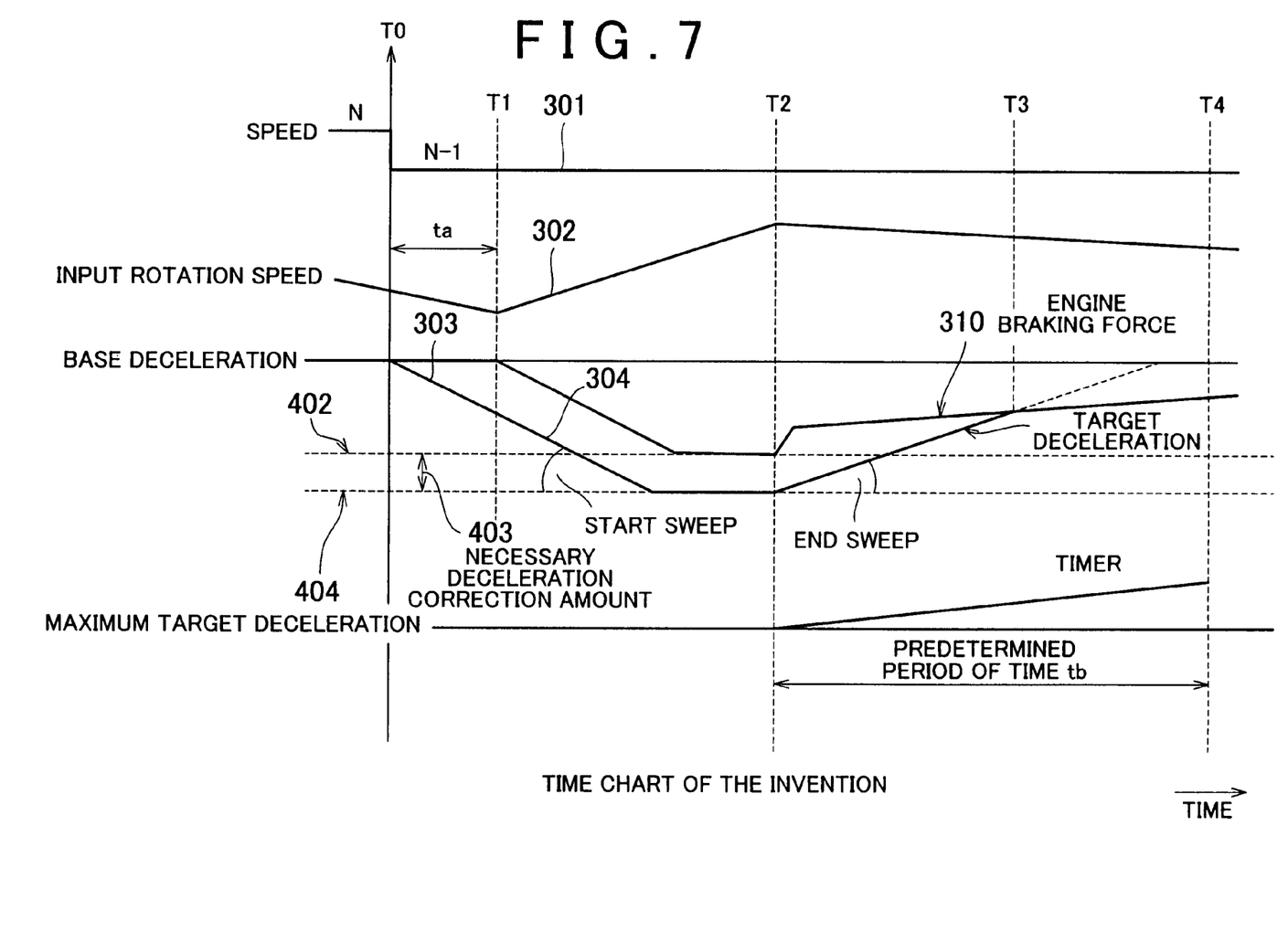
FIG. 7 is a time chart of the operation by the deceleration control apparatus for a vehicle according to the first exemplary embodiment of the invention.

FIG. 7 is a time chart showing the deceleration control of the exemplary embodiment. FIG. 7 shows a speed command 301 of the automatic transmission 10, an input shaft rotation speed 302 of the automatic transmission 10, an engine braking force (torque of the output shaft 120c of the automatic transmission 10) 310, a target deceleration 303, a base deceleration 402, a correction amount 403 necessary for deceleration (hereinafter simply referred to as "necessary deceleration correction amount 403"), and a maximum target deceleration 404.

In FIG. 6, the longitudinal axis represents the vehicle speed and the horizontal axis represents distance. The corner 501 ahead of the vehicle C is before point 502 along line B. The accelerator is turned off (i.e., the accelerator opening amount is zero with the accelerator being fully closed) at a location corresponding to line A. The brake is also turned off at location A. Location A is located before the entrance 502 of the corner 501, with a distance L between it and the entrance 502 of the corner 501.

First it is determined (not shown) whether there is a need for the corner control (i.e., shift point control) of the exemplary embodiment shown in FIG. 1A and FIG. 1B. That is, the control circuit 130 determines whether there is a need for the control based on, for example, the control execution boundary line Lc. If the coordinates of the current vehicle speed and the distance to the entrance 502 of the corner 501 are above the control execution boundary line Lc on the graph in FIG. 6, it is determined that the control is necessary and step S1 in FIG. 1A is executed. If, on the other hand, those coordinates are below the control execution boundary line Lc, it is determined that the control is unnecessary and the control flow in FIG. 1A and FIG. 1B is not executed.

The control execution boundary line Lc is a line which corresponds to the boundary of a range beyond which, due to the relationship of the current vehicle speed and the distance to the entrance 502 of the corner 501, the vehicle speed will be unable to reach a recommended vehicle speed Vreq by the entrance 502 of the corner 501 unless a deceleration beyond the deceleration achieved by normal braking, which is set beforehand, is applied to the vehicle (i.e., beyond which the vehicle will be unable to turn the corner 501 at a desired lateral acceleration). That is, if the coordinates of the current vehicle speed and the distance to the entrance 502 of the corner 501 are above the control execution boundary line Lc, it is necessary to apply a deceleration beyond the deceleration achieved by normal braking set beforehand to the vehicle C in order to reach the recommended vehicle speed Vreq by the entrance 502 of the corner 501.

Therefore, when the coordinates are above the control execution boundary line Lc, a deceleration control corresponding to the curvature radius R of the corner according to this exemplary embodiment is executed (FIG. 1A and FIG. 1B), such that the recommended vehicle speed Vreq is able to be reached by the entrance 502 of the corner 501 due to an increase in the deceleration, even if the driver is not performing a brake operation or the operation amount of the brake is relatively small (i.e., even if the footbrake is only being depressed slightly).

Figure 8:
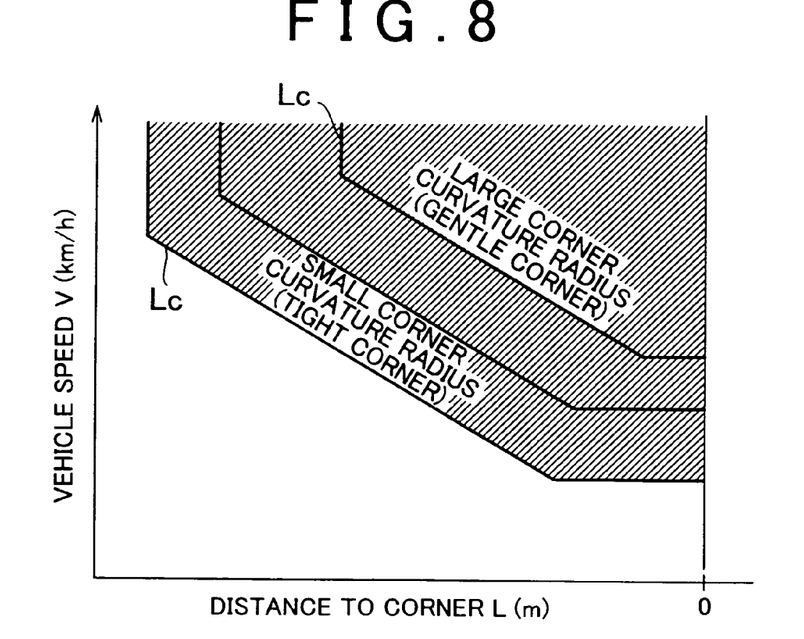
FIG. 8 is a graph illustrating a control execution boundary line Lc of the deceleration control apparatus for a vehicle according to the first exemplary embodiment of the invention.

FIG. 8 is a graph illustrating the control execution boundary line Lc. The area with hatching represents a deceleration range calculated based on the recommended vehicle speed Vreq determined from the curvature radius R of the corner 501 of the road ahead of the vehicle. This deceleration range is in an area where the vehicle speed is high and the distance L from the corner is small. The control execution boundary line Lc, which represents the boundary of this deceleration range, is set to shift closer to the side where the vehicle speed is higher and the distance to the corner 501 is smaller the smaller the curvature radius R of the corner 501. When the actual speed V of a vehicle that is right before the corner exceeds the control execution boundary line Lc in FIG. 8, deceleration control corresponding to the curvature radius R of the corner according to this exemplary embodiment is executed (FIG. 1A and FIG. 1B).

A typical control execution boundary line conventionally used for shift point control corresponding to the curvature radius R of the corner can be applied as the control execution boundary line Lc of this exemplary embodiment. The control execution boundary line Lc is generated by the control circuit 130 based on data indicative of the curvature radius R of the corner 501 and the distance L to the corner 501 input from the navigation system 95.

In this exemplary embodiment, it is determined that the control is necessary because the location corresponding to line A where the accelerator opening amount 301 is zero is above the control execution boundary line Lc. As a result, step S1 is executed. In the example described above, the determination of whether to execute the deceleration control (FIG. 1A and FIG. 1B) corresponding to the curvature radius R of the corner according to the exemplary embodiment is made using the control execution boundary line Lc. Alternatively, however, that determination may be made based on a factor other than the control execution boundary line Lc.

In step S1 in FIG. 1A, the control circuit 130 determines whether the accelerator is off (i.e., fully closed) based on a signal from the throttle opening sensor 114. If it is determined that the accelerator is off, then step S2 is executed. When the accelerator is fully closed (i.e., YES in step S1), it is determined that the driver intends to downshift. If, on the other hand, it is determined that the accelerator is not off, the control flow returns. As described above, the accelerator opening amount becomes zero (i.e., fully closed) at the point corresponding to line A in FIG. 6.

In step S2, the control circuit 130 determines whether the brake is off. When the brake is off in step S2, it means that the brake is off because a brake pedal (not shown) is not being operated by the driver. This determination is made based on output from a brake sensor (not shown) that is input via the brake control circuit 230. If it is determined in step S2 that the brake is off, step S3 is executed. When the brake is off (i.e., YES in step S2), the deceleration control according to the exemplary embodiment is executed. If, on the other hand, it is determined that the brake is not off, the control flow returns.

Figure 9:
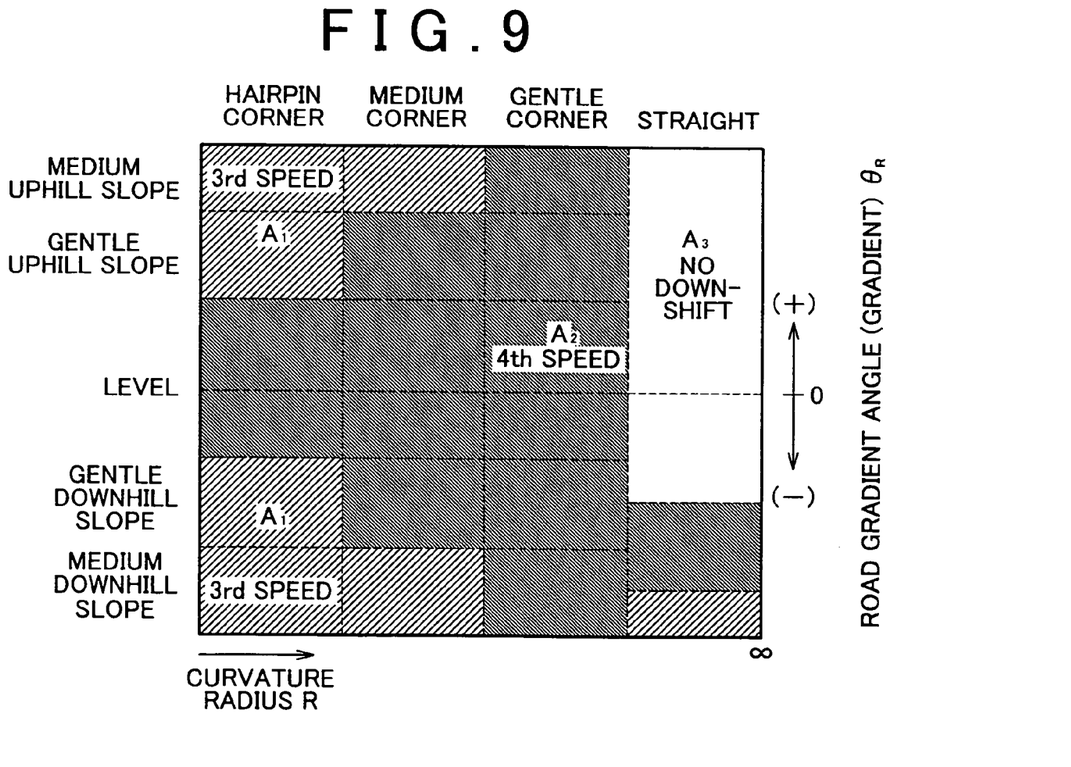
FIG. 9 is a downshift determination map of the deceleration control apparatus for a vehicle according to the first exemplary embodiment of the invention.

In step S3, the control circuit 130 determines whether there is an output for a downshift by corner control. A downshift determination map shown in FIG. 9 is used to make this determination. In FIG. 9, the speed into which the transmission is to be shifted, i.e., target downshift speed, in the corner control is determined based on the curvature radius R (or curvature) of the corner 501 and a road gradient $\theta_R$ at location A where both the accelerator and the brake are off (i.e., YES in both steps S1 and S2).

FIG. 9 is a downshift determination map which has a plurality of various ranges corresponding to operations by the driver in a two dimensional coordinate system with a horizontal axis representing the curvature radius R of a curved section of road ahead of the vehicle and a vertical axis representing the gradient $\theta_R$ of the road on which the vehicle is traveling. This downshift determination map has a first downshift range A1, a second downshift range A2, and a no-downshift range A3. The uphill driving force or the engine braking force when traveling downhill is set on the downshift determination map to be stronger than those produced by automatic shift control using the shift line map in FIG. 5.

The first downshift range A1 corresponds to i) a road with a tight curve (i.e., a small curvature radius R) and a steep (large) road gradient $\theta_R$, which requires a relatively large uphill driving force or engine braking force when traveling downhill, or ii) a straight downhill with a relatively large gradient $\theta_R$ that requires a relatively large engine braking force. A shift into third speed is determined when the point indicative of the curvature radius R and the road gradient $\theta_R$ is within range A1.

The second downshift range A2 corresponds to i) a road with a medium curve (i.e., in which the curvature radius R is medium) and a medium slope $\theta_R$, which requires a medium uphill driving force or engine braking force when traveling downhill, or ii) a road with a gentle curve (i.e., in which the curvature radius is relatively large) and a relatively gradual (i.e., small) road gradient $\theta_R$, which requires a relatively small increase in uphill driving force or engine braking force when traveling downhill. A shift into fourth speed is determined when the point indicative of the curvature radius R and the road gradient $\theta_R$ is within range A2.

The no-downshift range A3 corresponds to a straight uphill slope or a gradual downhill slope which does not require an increase in engine braking force. The no-downshift range A3 ensures that a determination to downshift will not be made regardless of an operation by the driver when the point indicative of the curvature radius R and the road gradient $\theta_R$ is within the range A3.

Here, the corner 501 is a medium-sized corner with a medium curvature radius R, with a gradual downward slope at location A. In this case, the downshift determination map in FIG. 9 shows that the optimum speed is fourth speed. In step S3, the optimum speed set by the downshift determination map is compared with the current speed, and it is determined whether the current speed is a higher speed than the optimum speed. If the current speed is a higher speed than the optimum speed, it is determined that it is necessary to output a downshift by corner control (i.e., YES in step S3) and step S4 is executed. If, on the other hand, the current speed is not higher than the optimum speed, it is determined that it is not necessary to output a downshift by corner control (i.e., NO in step S3) and the control flow returns.

In this example, when the current speed at location A is fifth speed, then it is determined in step S3 that it is necessary to output a downshift into fourth speed. In this case, the downshift command 301 into fourth speed is output at time T0, as shown by FIG. 7.

When the control circuit 130 determines the speed to be selected in step S3 (fourth speed in this example) as described above, a shift command (i.e., the downshift command 301) is output. That is, the downshift command 301 is output from the CPU 131 of the control circuit 130 to the electromagnetic valve driving portions 138*a* to 138*c*. These electromagnetic valve driving portions 138*a* to 138*c* then energize or de-energize the electromagnetic valves 121*a* to 121*c* according to the downshift command 301. As a result, the shift specified by the downshift command 301 is performed in the automatic transmission 10.

When the control circuit 130 determines that there is a need to downshift by shift point control according to this exemplary embodiment at a location (i.e., time T0 in FIG. 7) corresponding to line A in FIG. 6 (i.e., YES in step S3), the downshift command 301 is output upon that determination (i.e., at time T0). Here, as shown in FIG. 7, it takes a predetermined period of time ta once the downshift command 301 is output until the shift actually starts. As a result, the shift starts from time T1 after the period of time ta has passed, at which time the engine braking force 310 starts to act on the vehicle. As described above, the period of time from time T0 when the downshift command 301 is output until time T1 when the shift actually starts is determined based on the type of shift (e.g., by the combination of the speed before the shift and the speed after the shift, such as 4th→3rd or 3rd→2nd). Also, when the downshift actually starts from time T1, the input shaft rotation speed 302 of the automatic transmission 10 starts to increase.

Figure 10:
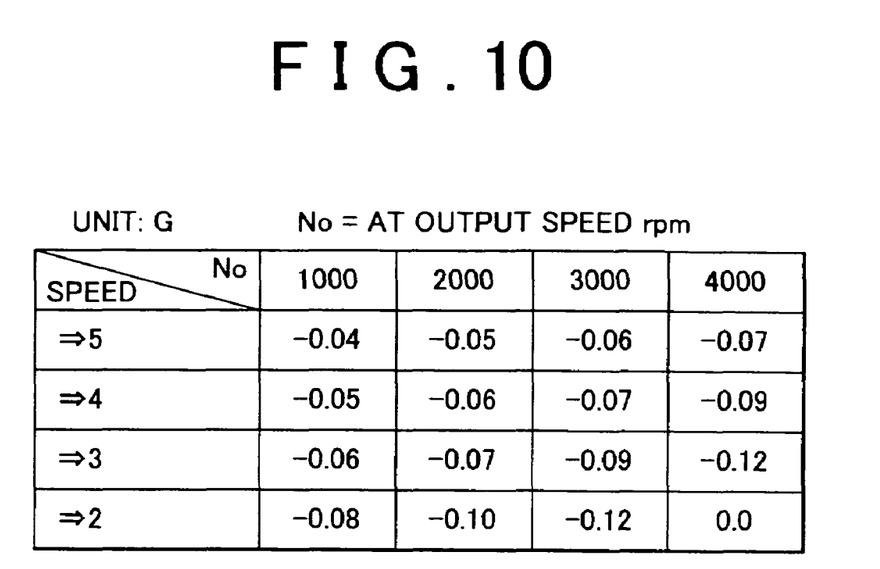
FIG. 10 is map showing the deceleration produced in each speed by the deceleration control apparatus for a vehicle according to the first exemplary embodiment of the invention.

In step S4, the control circuit 130 obtains a base deceleration 402. A base deceleration map shown in FIG. 10 is used in making the determination of step S4. In the base deceleration map in FIG. 10, the maximum value of the deceleration, which is determined from the target shift speed (the type of shift) and the vehicle speed (corresponding to the rotation speed No of the output shaft 120*c* of the automatic transmission 10), acting on the vehicle from that shift is set as the base deceleration 402. As shown in FIG. 7, the base deceleration 402 is the same as the maximum value of the engine braking force 310 (i.e., the engine braking force 310 at time T2 when the shift ends).

In this example, when the shift is a downshift from fifth speed into fourth speed and the rotation speed No of the output shaft 120*c* of the automatic transmission 10 is 2000 rpm, the base deceleration 402 is −0.06 G. After step S4, step S5 is executed.

Figure 11:
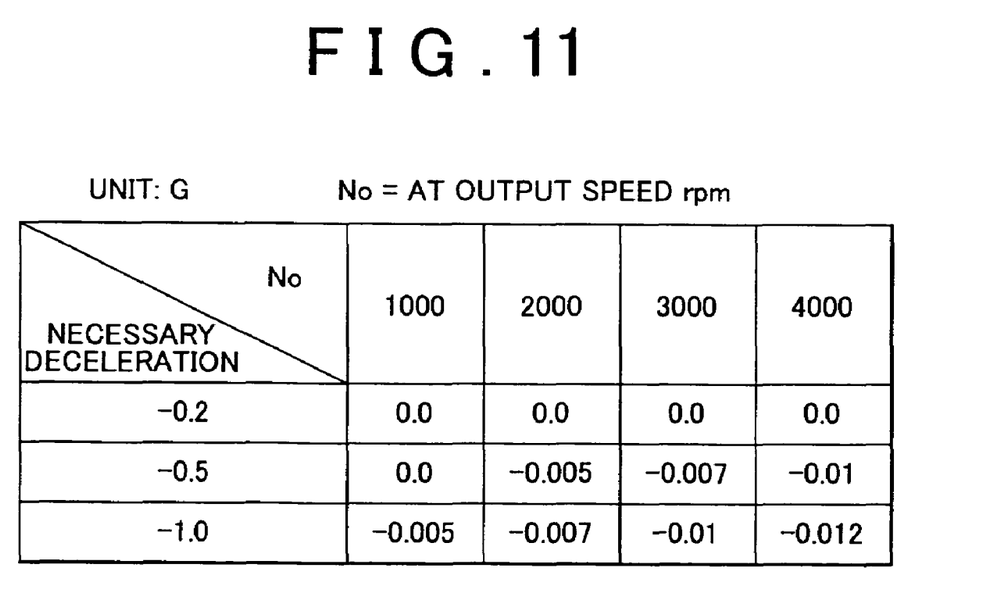
FIG. 11 is a map showing the deceleration correction quantities for correcting the deceleration according to the necessary deceleration in the deceleration control apparatus for a vehicle according to the first exemplary embodiment of the invention.

In step S5, the control circuit 130 obtains the necessary deceleration correction amount 403. A necessary deceleration correction amount map shown in FIG. 11 is used in making the determination of step S5. In the necessary deceleration correction amount map in FIG. 11, the necessary deceleration correction amount 403 is set based on the necessary deceleration 401 and the vehicle speed (corresponding to the rotation speed No of the output shaft 120*c* of the automatic transmission 10).

First, the necessary deceleration 401 will be described. The necessary deceleration 401 is a deceleration that is necessary to turn the upcoming corner 501 at a preset desired lateral acceleration (i.e., that is necessary to enter the corner 501 at the desired recommended vehicle speed Vreq). That is, it is the slope of the vehicle speed trajectory in order to enter the corner 501 at the desired recommended vehicle speed Vreq. The recommended vehicle speed Vreq is a value that corresponds to the curvature radius R (or curvature) of the corner 501. A deceleration such as that shown by the necessary deceleration 401 in FIG. 6 is necessary to decelerate the vehicle from the vehicle speed at location A, where it was determined in steps Si and S2 that the accelerator is fully closed and the brake is off, to the recommended vehicle speed Vreq that is required at the entrance 502 of the corner 501. The necessary deceleration 401 increases to a larger value the closer the point at which it is determined that the accelerator is fully closed and the brake is off is to the entrance 502 of the corner 501. (Note: when the deceleration or the correction amount referred to here and throughout this specification is said to be large or small, it is referring to the size of the absolute value of the deceleration or the correction amount.)

The control circuit 130 calculates the necessary deceleration 401 based on the current vehicle speed input from the vehicle speed sensor 122 and the distance L from the current position of the vehicle to the entrance 502 of the corner 501 and the curvature radius R of the corner 501 input from the navigation system 95. The method for obtaining the necessary deceleration 401 is as follows.

First, the recommended vehicle speed Vreq at the entrance 502 of the corner 501 is obtained (1). Then, the necessary deceleration 401 is obtained (2). The following description will be broken into two parts (i.e., (1) and (2)).

(1) Calculation of the recommended vehicle speed Vreq

The recommended vehicle speed Vreq may be obtained according to expression 1 below.

$$Vreq = \sqrt{G \times 9.8 \times R} \quad [1]$$

Here, G is the lateral acceleration while in the corner and R is the curvature radius of the corner.

The derivation of expression [1] is as follows.

$$\alpha = V \times \omega = R \times \omega^2 = V^2/R \quad [2]$$

(according to the uniform circular motion system)

Here, $\alpha$ is the acceleration, $\omega$ is the angular speed, V is the speed, and R is the radius.

According to expression [2] above, $$V = \sqrt{\alpha \times R} \quad \alpha = G \times 9.8 \text{ (9.8 being gravitational acceleration) so}$$

$$V = \sqrt{G \times 9.8 \times R}$$

(2) Calculation of the necessary deceleration 401 When the necessary deceleration 401 is Greq, Greq can be obtained according to expression [3] below.

$$Greq = (V^2 - Vreq^2)/(2 \times L \times 9.8) \quad [3]$$

Here, V is the current vehicle speed (when the accelerator is off) and L is the distance fro, the vehicle to the corner.

The derivation of expression [3] is as follows.

$$V_1 = V_0 + \alpha \times t \quad [4]$$

(according to the uniform circular motion system)

$$L = V_0 \times t + \tfrac{1}{2} \times \alpha \times t^2 \quad [5]$$

(according to the uniform circular motion system)

Here, $V_0$ is the initial speed, $V_1$ is the speed after t seconds, $\alpha$ is the acceleration, t is the time, and L is the distance moved.

According to expression [4] above, $$t = (V_1 - V_0)/\alpha \quad [6]$$

Substituting expression [6] for part of expression [5], we get:

$$L = V_0 \times (V_1 - V_0)/\alpha + \alpha \times (V_1 - V_0)^2/(2 \times \alpha^2)$$

$$L = (V_1^2 - V_0^2)/(2 \times \alpha)$$

$$\alpha = (V_1^2 - V_0^2)/(2 \times L)$$

Converting $\alpha$ into G, we get:

$$G = (V_1^2 - V_0^2)/(2 \times L \times 9.8)$$

As described above, once the necessary deceleration 401 is obtained, the necessary deceleration correction amount 403 can then be obtained from the necessary deceleration 401 and the vehicle speed (corresponding to the rotation speed No of the output shaft 120c of the automatic transmission 10), as shown in FIG. 11. According to expression [3], when the distance L to the corner is small, the necessary deceleration 401 (Greq) is large. FIG. 11 shows that the necessary deceleration correction amount 403 increases the larger the necessary deceleration 401. In this case, as in the rest of this specification, the deceleration is determined to be large or small depending on whether its absolute value is large or small.

The value of G (i.e., the lateral acceleration) in expression [1] can be set variably.

In this example, when the necessary deceleration 401 is 0.5 G and the rotation speed No of the output shaft 120c of the automatic transmission 10 is 2000 rpm, the necessary deceleration correction amount 403 is –0.005 G. After step S5, step S6 is executed.

Here, the necessary deceleration correction value 403 is not obtained theoretically, but is a suitable value that is able to be set appropriately from the various conditions. That is, in a sports car, for example, a relatively large deceleration is preferable when decelerating, so the value of the necessary deceleration correction value 403 can be set to a large value. Also, in the same vehicle, the value of the necessary deceleration correction value 403 can be variably controlled according to the speed. In a vehicle in which a so-called sport mode (which aims to increase the vehicle response to an operation by the driver so as to achieve crisp and precise handling), a so-called luxury mode (which aims to achieve a relaxed and easy response to an operation by the driver), a so-called economy mode or normal mode (which aims to achieve fuel efficient running), and a so-called snow mode (which aims to improve vehicle running on road with a friction coefficient of a snowy road or the like are available, when the sport mode is selected, the necessary deceleration correction value 403 is set to be a larger value than it would be in the luxury mode or the economy mode. When the snow mode is selected, the necessary deceleration correction value 403 set to be a lower value than it would be in the luxury mode or economy mode. These modes may be selected manually by the driver or automatically by the vehicle.

In step S6, the control circuit 130 obtains a maximum target deceleration 404. The maximum target deceleration 404 is obtained as the sum of the base deceleration 402 obtained in step S4 and the necessary deceleration correction value 403 obtained in step S5. In this example, the base deceleration 402 is –0.06 G and the necessary deceleration correction value 403 is –0.005 G, so the maximum target deceleration 404 is –0.065 G. After step S6, step S7 is executed.

In step S7, the control circuit 130 sets the target deceleration 303 so that it decreases at a predetermined gradient (i.e., starts to sweep down) to the maximum target deceleration 404. The gradient at which the target deceleration 303 starts to sweep down increases the deceleration gradually so as to suppress shock, and therefore a feeling of discomfort, due to sudden braking. This gradient is preferably set so that the target deceleration 303 reaches the maximum target deceleration 404 either at substantially the same time, or slightly before, the engine braking force 310 reaches the base deceleration 402.

The predetermined gradient can be changed based on the accelerator return rate when the control starts (i.e., right before the vehicle reaches the location corresponding to line A in FIG. 6) and the opening amount of the accelerator before it is returned. For example, the gradient can be set large when the accelerator return rate or the opening amount of the accelerator before it is returned is large, and small when the friction coefficient of the road surface is low. Also, the predetermined gradient can also be set based on the vehicle speed. In this case, the predetermined gradient can be set to increase the greater the vehicle speed. After step S7, step S8 is executed.

In step S8, the brake control circuit 230 executes brake feedback control so that the actual deceleration 304 that acts on the vehicle matches the target deceleration 303. This brake feedback control starts at time T0 when the downshift command 301 is output.

That is, a signal indicative of the target deceleration 303 is output from time T0 as the brake braking force signal SG1 from the control circuit 130 to the brake control circuit 230 via the brake braking force signal line L1. Then based on the brake braking force signal SG1 input from the control circuit 130, the brake control circuit 230 generates the brake control signal SG2 and outputs it to the hydraulic pressure control circuit 220.

The hydraulic pressure control circuit 220 then generates a braking force as indicated by the brake control signal SG2 by controlling the hydraulic pressure supplied to the brake devices 208, 209, 210, and 211 based on the brake control signal SG2.

In the feedback control of the brake system 200 in step S8, the target value is the target deceleration 303, the control amount is the actual deceleration 304 of the vehicle, the objects to be controlled are the brakes (brake devices 208, 209, 210, and 211), the operating amount is the brake control amount (not shown), and the disturbance is mainly the deceleration 310 caused by the shift of the automatic transmission 10. The actual deceleration 304 of the vehicle is detected by the acceleration sensor 90.

That is, in the brake system 200, the brake braking force (i.e., brake control amount) is controlled so that the actual deceleration 304 of the vehicle comes to match the target deceleration 303. That is, the brake control amount is set to produce a deceleration that makes up for the difference between the deceleration 310 caused by the shift of the automatic transmission 10 and the target deceleration 303 in the vehicle.

In the example shown in FIG. 7, the deceleration 310 caused by the automatic transmission 10 is zero from time T0 when the downshift command is output until time T1 when the automatic transmission 10 actually starts to shift. Therefore, the brake control amount is set such that the entire target deceleration 303 is achieved using only the brakes. From time T1 the automatic transmission 10 starts to shift, and the brake control amount decreases as the deceleration 310 caused by the automatic transmission 10 increases.

In step S9, the control circuit 130 determines whether the shift of the automatic transmission 10 has ended. This determination is made based on whether the input shaft rotation speed of the automatic transmission 10 is substantially equal to the gear ratio after the shift multiplied by the rotation speed No of the output shaft 120c of the automatic transmission 10. If the shift of the automatic transmission 10 has not ended (i.e., NO in step S9), the routine is repeated until it has. If the shift of the automatic transmission 10 has ended (i.e., YES in step S9), then step S10 is executed. In the example in FIG. 7, the shift of the automatic transmission 10 ends at time T2.

In step S10, the control circuit 130 sets the target deceleration 303 to increase at a predetermined gradient (end sweep). The brake feedback control that started in step S8 is performed so that the actual deceleration 304 matches the target deceleration 303. As a result, shock following the shift is able to be kept to a minimum. After step S10, step S11 is executed.

In step S11, the control circuit 130 determines whether the target deceleration 303 matches the engine braking force 310. If the target deceleration 303 does match the engine braking force 310, then step S12 is executed. If not, step S13 is executed. In the example shown in FIG. 7, the target deceleration 303 matches the engine braking force 310 at time T3. The brake control amount when the target deceleration 303 matches the engine braking force 310 is zero.

In step S12, the brake feedback control which started in step S8 ends.

The gradient of the target deceleration 303 that was increased in step S10 remains gradual until the target deceleration 303 reaches the final deceleration (engine braking force 310) produced by the downshift of the automatic transmission 10 at time T3. The setting of the target deceleration 303 ends when it reaches the final deceleration. At that point, the final deceleration, which is the engine braking force 310 required by the downshift based on the curvature radius R of the corner, acts on the vehicle as the actual deceleration 304 of the vehicle, so from that point on, brake control according to the exemplary embodiment is no longer necessary.

In step S13, the control circuit 130 determines whether a predetermined period of time tb has passed from time T2 when it was determined that the shift had ended. If the predetermined period of time tb has passed (i.e., YES in step S13), then step S12 is executed and the brake control ends. If, on the other hand, it is determined that the predetermined period of time tb has not yet passed (i.e., NO in step S13), then the process returns to step S10 where the target deceleration 303 is gradually increased and brake control continued. After a predetermined period of time has passed after it has been determined that the shift has ended, the brake control is ended (i.e., YES in step S13; step S12) even if it is determined that the target deceleration 303 does not match the engine braking force 310 for some reason (i.e., NO in step S11).

The foregoing exemplary embodiment enables the following effects to be achieved.

This exemplary embodiment improves responsiveness when the deceleration force acts on the vehicle. The brakes are cooperatively controlled simultaneously with the output of a downshift command in response to a deceleration demand (i.e., a deceleration operation) by the driver. Therefore, even between the time the downshift command is output until the shift actually starts and engine braking force is generated (i.e., from time T0 to time T1 in FIG. 7), good response is able to be obtained by generating deceleration force with the brakes.

Also according to this exemplary embodiment, a deceleration force according to the timing of a deceleration operation (i.e., accelerator off) by the driver can be applied to the vehicle. As shown in FIG. 11, the necessary deceleration correction value 403 is determined based on the necessary deceleration 401 that reflects the timing of the deceleration operation (i.e., the distance L from the corner 501), so a deceleration force according to the timing of the deceleration operation is able to be applied to the vehicle. That is, even if the curvature radius of the corner R, the target lateral acceleration in the corner, and the vehicle speed V at the time of the deceleration operation are the same, when the distance between the place where the deceleration operation is performed and the corner is large (i.e., when the deceleration operation is performed far from the corner 501), the necessary deceleration correction value 403 is zero, and when the distance between the place where the deceleration operation is performed and the corner is small (i.e., when the deceleration operation is performed close to the corner 501), the necessary deceleration correction value 403 is large (i.e., the deceleration force is increased).

Conventionally in shift point control based on the curvature radius R of a corner, the target downshift speed (i.e., the downshift amount) in the corner control (shift point control) was determined based on the curvature radius R (or curvature) of the corner 501 and the road gradient at location A where both the accelerator and the brake are off (i.e., YES in steps S1 and S2), and only the deceleration from the downshift into that speed was applied to the vehicle. That is, conventionally, when the downshift amount was determined, it was done so irrespective of the distance L from the location where the driver performed the deceleration operation (i.e., accelerator off) to the corner 501, and only a deceleration corresponding to that downshift amount was applied to the vehicle. Therefore, even when the timing and the location (i.e., the distance L from the corner 501) at which the driver performs a deceleration operation (i.e., accelerator off) are different, the downshift amount is still set the same regardless of the fact that the necessary deceleration 401 is different. As a result, only that same deceleration acts on the vehicle.

In contrast, according to this exemplary embodiment, the necessary deceleration correction value 403 is set based on the necessary deceleration 401 that reflects the distance L from the location where the deceleration operation was performed by the driver to the corner 501, and that necessary deceleration correction value 403 is applied to the vehicle by the brakes. That is, the maximum target deceleration 404, which is the sum of the deceleration (base deceleration 402) corresponding to the downshift amount and the necessary deceleration correction value 403 that reflects the location where the deceleration operation was performed by the driver, acts on the vehicle as an overall result of the cooperative control of the automatic transmission and the brakes according to this exemplary embodiment. As a result, optimum deceleration characteristics according to the location where the deceleration operation was performed by the driver are able to be obtained.

As described above, according to this exemplary embodiment, when a corner is detected and downshift control (shift point control) is executed in response to an intention to downshift by the driver, the necessary deceleration correction value 403, which is determined by the vehicle speed, the curvature radius R of the corner, the timing of a deceleration demand by the driver, and the target lateral acceleration at the corner, is added to the deceleration by the speed into which the automatic transmission 10 was downshifted. The deceleration corresponding to that necessary deceleration correction value 403 is generated by the brakes. As a result, optimum deceleration characteristics and acceleration characteristics are able to be achieved.

Even if the distance L to the entrance 502 of the corner 501 and the vehicle speed vary, the necessary deceleration 303 (402, 403, 404) according to the specific distance L and the specific vehicle speed is obtained, and that necessary deceleration 303 is able to be applied to the vehicle reliably and smoothly using the automatic transmission 10 and the brakes. Also, good acceleration characteristics can be obtained also at the beginning of the corner by coordinating the deceleration produced by the brakes with the deceleration produced by the speed of the automatic transmission 10.

Further, the downshift amount can be set that takes into account the balance between the deceleration force and the acceleration force. Depending on the engine, the balance between the deceleration force and the acceleration force may be poor even in the same speed. For example, in a given corner, while third speed in a V8 engine may produce a suitable deceleration force prior to entering the corner, it may produce too much acceleration force after coming out of the corner. In this case, in the exemplary embodiment, prior to entering the corner, an engine braking force of fourth speed is generated by shifting into fourth speed while a deceleration force (i.e., a necessary deceleration correction amount) is generated by the brakes. This enables an overall deceleration corresponding to the engine braking force of third speed to be applied to the vehicle going into the corner, and an acceleration force of fourth speed to be generated coming out of the corner. In other words, a running control is realized that achieves both a deceleration force suitable for going into the corner and an acceleration force suitable for coming out of the corner.

Also, in a FR vehicle, stability of the vehicle, particularly on roads with a low friction coefficient, is improved due to the fact that a braking force by the brakes acts on the front wheels as well. Because the engine braking force in a FR vehicle is applied to the rear wheels, the vehicle behavior may become unstable, particularly on roads with a low friction coefficient, when there is deceleration by only the engine braking force from a downshift. In contrast, according to this exemplary embodiment, the deceleration force from the brakes also acts on the front wheels, which improves vehicle stability. For example, in a situation (a corner) in which, conventionally, the transmission is downshifted into third speed and the deceleration force only acts on the rear wheels, in this exemplary embodiment, the transmission would be downshifted into fourth speed, and although that deceleration force would act only on the rear wheels, the necessary deceleration correction amount generated by the brakes would also act on the front wheels so stability of the vehicle is improved. Here, the necessary deceleration correction amount is set so that the total deceleration force is the same, that is, the necessary deceleration correction amount plus the engine braking force from the downshift into fourth speed equals the engine braking force from the downshift into third speed. Even though the total deceleration force is the same, the stability of the vehicle is much better in this exemplary embodiment.

The brake control in this exemplary embodiment may also use a brake system that generates braking force in the vehicle other than the brakes, such as a regenerative brake by an MG (Motor-Generator) provided in a power train system, or an exhaust brake. Further, in the above description, the deceleration (G) is used as the amount that the vehicle is to be decelerated. Alternatively, however, the control may also be performed based on the deceleration torque. Also, the foregoing exemplary embodiment may be modified so that the entire deceleration corresponding to the target deceleration 303 obtained by the same method as described above is generated by the brakes alone and shift control of the automatic transmission 10 is not performed.

While the invention has been described with reference to exemplary embodiments thereof, it is to be understood that the invention is no limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A deceleration control apparatus for a vehicle, which performs deceleration control on the vehicle by an operation of a brake system which applies a braking force to the vehicle and a shift operation which shifts a transmission of the vehicle into a relatively low speed or speed ratio, comprising:
a controller which i) determines a deceleration to be applied to the vehicle as a base deceleration based on a curvature or curvature radius of a curve in a road ahead of the vehicle, and ii) determines a deceleration correction amount based on a distance to the curve, and wherein the deceleration correction amount is combined with the base deceleration to control deceleration of the vehicle.

2. The deceleration control apparatus for a vehicle according to claim 1, wherein the controller determines the base deceleration as a speed change amount in the shift operation.

3. The deceleration control apparatus for a vehicle according to claim 1, wherein the correction amount is a deceleration to be applied to the vehicle by the operation of the braking system.

4. The deceleration control apparatus for a vehicle according to claim 1, wherein the correction amount includes zero.

5. The deceleration control apparatus for a vehicle according to claim 1, wherein the correction amount is determined based on the curvature or curvature radius of the curve, the vehicle speed, and a target lateral acceleration at the curve, in addition to the distance to the curve.

6. The deceleration control apparatus for a vehicle according to claim 1, wherein the controller controls the brake system so that deceleration produced by the brake system gradually decreases from the time the shift operation ends.

7. The deceleration control apparatus for a vehicle according to claim 1, wherein the controller determines the correction amount of the deceleration based on vehicle speed.

8. The deceleration control apparatus according to claim 1, wherein, based on current vehicle speed and the distance to the curve, the controller determines whether deceleration control is needed, and if the controller determines deceleration control is needed, the controller controls deceleration using said base deceleration combined with said deceleration correction amount.

9. The deceleration control apparatus according to claim 8, wherein, if the controller determines deceleration control is needed, the controller controls deceleration using said base deceleration and said deceleration correction amount even if the vehicle has not yet begun to turn to travel in the curve.

10. The deceleration control according to claim 9, wherein if the controller determines deceleration control is needed the controller controls deceleration using said base deceleration and said deceleration correction amount even if the vehicle is traveling straight.

11. The deceleration control according to claim 1, wherein the controller determines that a deceleration control is needed in response to a determination that: (a) an accelerator is off, and (b) braking is insufficient to reach a predetermined vehicle speed at a predetermined position of the curve; and
wherein, in response to a determination that deceleration control is needed, the controller controls deceleration using the base deceleration and the deceleration correction amount.

12. The deceleration control according to claim 11, wherein the base deceleration is determined based on a radius of the curve and a gradient of the road, and wherein the deceleration correction amount is determined based on distance to the curve and vehicle speed.

13. The deceleration control according to claim 1, wherein the controller controls a shift operation based on the radius of the curve, and wherein the controller controls braking based on distance to the curve.

14. A deceleration control method for a vehicle, by which deceleration control is performed on the vehicle by an operation of a brake system which applies a braking force to the vehicle and a shift operation which shifts a transmission of the vehicle into a relatively low speed or speed ratio, comprising:
determining a deceleration to be applied to the vehicle as a base deceleration based on a curvature or curvature radius of a curve in a road ahead of the vehicle;
determining a deceleration correction amount based on a distance to the curve, and wherein the deceleration correction amount is combined with the base deceleration amount to control deceleration of the vehicle; and
performing the shift operation and the operation of the brake system such that a deceleration which is the sum of the base deceleration and the correction amount acts on the vehicle.

15. The deceleration control method for a vehicle according to claim 14, wherein the base deceleration is determined as a speed change amount in the shift operation.

16. The deceleration control method for a vehicle according to claim 14, wherein the correction amount is a deceleration to be applied to the vehicle by the operation of the braking system.

17. The deceleration control method for a vehicle according to claim 14, wherein the correction amount includes zero.

18. The deceleration control method for a vehicle according to claim 14, wherein the correction amount is determined based on the curvature or curvature radius of the curve, a vehicle speed, and a target lateral acceleration at the curve, in addition to the distance to the curve.

19. The deceleration control method for a vehicle according to claim 14, further comprising:
controlling the brake system so that deceleration produced by the brake system gradually decreases from the time the shift operation ends.

20. The deceleration control method for a vehicle according to claim 14, wherein the correction amount is based on vehicle speed.

* * * * *